US010654527B2

(12) United States Patent
Tollis et al.

(10) Patent No.: US 10,654,527 B2
(45) Date of Patent: May 19, 2020

(54) INTEGRATED FASTENER FOR INSTRUMENTATION CLUSTER (71) Applicant: Continental Automotive Systems, Inc., Auburn Hills, MI (US)

(72) Inventors: Daniel P. Tollis, Novi, MI (US); Francisco Bolanos Ramirez, Zapopan (MX); Michael E. Carrel, Northville, MI (US); Fernando De Anda Gonzalez, Guadalajara (MX); Kevin Michael Dyer, Macomb Township, MI (US); Augusto Guillermo Figueroa Tamayo, Guadalajara (MX); Johan Gomez Martinez, Zapopan (MX); Aldo Sainz Hernandez, Zapopan (MX)

(73) Assignee: Continental Automotive Systems, Inc, Auburn Hills, MI (US)

( * ) Notice: Subject to any disclaimer, the term of this patent is extended or adjusted under 35 U.S.C. 154(b) by 446 days.

(21) Appl. No.: 15/482,617

(22) Filed: Apr. 7, 2017

(65) Prior Publication Data
US 2017/0297630 A1    Oct. 19, 2017

Related U.S. Application Data (60) Provisional application No. 62/319,654, filed on Apr. 7, 2016.

(51) Int. Cl.
*B62D 25/14* (2006.01)
*B25B 27/14* (2006.01)
(Continued)

(52) U.S. Cl.
CPC .............. *B62D 25/14* (2013.01); *B25B 13/50* (2013.01); *B25B 27/14* (2013.01); *B60K 37/04* (2013.01);
(Continued)

(58) Field of Classification Search
CPC .... B62D 25/14; B60K 37/04; B60K 2370/91; B60K 2370/154; B60K 2370/81; B25B 13/50; B25B 27/14; F16B 3/00
See application file for complete search history.

(56) References Cited

U.S. PATENT DOCUMENTS 1,677,607 A * 7/1928 Wood .................. F16B 15/0015
411/403
2,083,825 A * 6/1937 Bousfield ............... G01D 11/24
116/305

(Continued)

*Primary Examiner* — Nimeshkumar D Patel
*Assistant Examiner* — Tania Courson (57) ABSTRACT

An integrated fastener for an instrument cluster assembly, where multiple integrated fasteners are used to connect the front cover of the assembly to the back cover. The instrument cluster assembly includes at least one fastener integrated into the back cover, a first recessed portion formed as part of the back cover, and a separation wall formed as part of the back cover in proximity to the first recessed portion. A first mounting aperture is formed as part of the separation wall, and the integrated fastener attached to the back cover and located in the first mounting aperture when the integrated fastener is in a first configuration. The integrated fastener is detached from the back cover and rotated such that the integrated fastener is placed in a second configuration, securing the front cover to the back cover.

18 Claims, 13 Drawing Sheets

(51) Int. Cl.
*F16B 3/00* (2006.01)
*B25B 13/50* (2006.01)
*B60K 37/04* (2006.01)

(52) U.S. Cl.
CPC .......... *F16B 3/00* (2013.01); *B60K 2370/154* (2019.05); *B60K 2370/81* (2019.05); *B60K 2370/91* (2019.05)

(56) References Cited

U.S. PATENT DOCUMENTS

| | | | | |
|---|---|---|---|---|
| 2,443,614 | A * | 6/1948 | Gray | F16B 39/32 411/259 |
| 2,509,980 | A * | 5/1950 | McCallum | A43C 15/161 36/62 |
| 3,220,078 | A * | 11/1965 | Preziosi | F16B 21/02 402/80 P |
| 3,820,501 | A * | 6/1974 | Foglein | B23Q 17/00 116/232 |
| 4,440,368 | A * | 4/1984 | Kitchen | G12B 9/00 248/27.1 |
| 4,920,799 | A * | 5/1990 | Low | G01D 11/24 248/27.1 |
| 5,027,678 | A * | 7/1991 | McCollom | B25B 13/06 188/77 R |
| 5,353,667 | A * | 10/1994 | Wilner | B25B 15/007 81/436 |
| 5,386,605 | A * | 2/1995 | Murphy | B25B 13/50 15/105 |
| 5,582,548 | A * | 12/1996 | Czegledi | B21K 1/46 411/404 |
| 5,678,912 | A * | 10/1997 | Ayres | B60K 37/02 362/23.17 |
| 6,476,320 | B1 * | 11/2002 | Ritter | B60K 37/02 174/17 CT |
| D480,618 | S * | 10/2003 | Petrsorich | D8/387 |
| 6,735,992 | B2 * | 5/2004 | Hauer | E02D 29/1427 292/150 |
| 6,854,350 | B2 * | 2/2005 | Ayres | B60K 37/02 362/23.18 |
| 7,299,725 | B2 * | 11/2007 | Helstern | F16B 31/021 81/468 |
| 7,427,143 | B1 * | 9/2008 | Coon | B60K 37/02 362/23.18 |
| 7,527,386 | B1 * | 5/2009 | Salinas Fox | G01D 11/28 362/23.18 |
| 9,677,918 | B2 * | 6/2017 | Birman | G01D 11/28 |
| 9,981,556 | B2 * | 5/2018 | Tollis | B60K 35/00 |
| 10,113,882 | B2 * | 10/2018 | Solet | G01D 7/00 |
| 2008/0101043 | A1 * | 5/2008 | Westberg | G01D 11/24 361/748 |
| 2013/0160561 | A1 * | 6/2013 | Chen | G01L 19/083 73/753 |
| 2019/0012936 | A1 * | 1/2019 | Yazdi | E05B 39/005 |

* cited by examiner

INTEGRATED FASTENER FOR INSTRUMENTATION CLUSTER

FIELD OF THE INVENTION

The invention relates generally to a fastener integrated into the back cover of an instrument cluster assembly.

BACKGROUND OF THE INVENTION

Instrument clusters are commonly used in almost every type of vehicle, and provide information to the operator of the vehicle, such as vehicle speed, engine temperature, oil pressure, fuel levels, and the like. Many types of instrument clusters include a housing which contains various components, such as gauges, indicator lights, a printed circuit board (PCB), and warning lights used to provide the driver with the various types of vehicle information mentioned above.

The housing is typically made of at least two parts, which are connected together after the gauges, indicator lights, and warning lights have been installed. The housing is assembled using one or more fasteners, such as a screw, a bracket, a clip, or the like. However, these types of fasteners are made separate from the housing and the rest of the components, and are an expense to produce.

Accordingly, there exists a need for a housing which is part of an instrument cluster assembly that may be assembled without the use of additional or separate fasteners.

SUMMARY OF THE INVENTION

The present invention is an integrated fastener for an instrument cluster assembly, where multiple integrated fasteners according to the present invention are used to connect the front cover of the assembly to the back cover. The fasteners are detached from the back cover, and rotated 90° to secure the front cover to the back cover.

In one embodiment, the present invention is an instrument cluster assembly, where the instrument cluster assembly includes a front cover, a back cover, at least one fastener integrated into the back cover, a first recessed portion formed as part of the back cover, and a separation wall formed as part of the back cover in proximity to the first recessed portion. A first mounting aperture is formed as part of the separation wall, and the integrated fastener attached to the back cover and located in the first mounting aperture when the integrated fastener is in a first configuration.

There is also at least one mounting projection formed as part of the separation wall, and at least one mounting recess formed as part of the at least one integrated fastener. The integrated fastener is detached from the back cover and rotated such that the integrated fastener is placed in a second configuration, where the mounting projection is disposed in the mounting recess, securing the front cover to the back cover.

The integrated fastener includes a base portion, a large flange portion integrally formed with the base portion, and a small flange portion integrally formed with the base portion. At least one gate and a slot are both formed as part of the large flange portion, and the gate is integrally formed with the front cover such that the integrated fastener is located in the first mounting aperture. The gate is cut to detach the integrated fastener from the back cover, and a tool having a key way is inserted into the slot to change the integrated fastener from a first configuration to a second configuration.

The integrated fastener also includes at least one retention surface formed as part of the large flange portion, and at least one retention surface formed as part of the small flange portion. In one embodiment, the retention surface formed as part of the small flange portion is an angled retention surface, which is used to increase the force applied to the separation wall and the inner wall by the integrated faster as the integrated fastener is rotated. The angle of the angled retention surface of the small flange portion may be varied to apply different amounts of force when the integrated fastener is rotated, making the fastener suitable for use with different instrument cluster assemblies having different load requirements, or where the front cover and back cover have different thicknesses.

A second recessed portion is formed as part of the front cover, an inner wall is formed as part of the recessed portion, and a second mounting aperture formed as part of the inner wall. The separation wall and the inner wall are disposed between the retention surface formed as part of the large flange portion, and the retention surface formed as part of the small flange portion when the integrated fastener is in the second configuration. At least a portion of the integrated fastener extends through the second mounting aperture when the integrated fastener is in the second configuration.

The present invention also includes at least one stopper wall formed as part of the first recessed portion, and the integrated fastener is in contact with the at least one stopper wall when the at least one integrated fastener is in the second configuration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

An instrument cluster assembly having an integrated fastener is shown in the Figures generally at 10. The assembly 10 includes a front cover 12a which is connected to a back cover 12b, and a printed circuit board (PCB) 14 is disposed between the front cover 12a and the back cover 12b. The front cover 12a, back cover 12b, and PCB 14 are shaped for connection with various electrical components, gauge components, graphics, and the like to complete the assembly of the instrument cluster assembly 10. The back cover 12b includes several integrated fasteners, shown generally at 16, used for connecting the front cover 12a to the back cover 12b. Each fastener 16 is substantially similar, so only one will be described in detail.

The fastener 16 is initially mounted in first recessed portion, shown generally at 18. The first recessed portion 18 includes a first quarter portion, shown generally at 20a, and a second quarter portion, shown generally at 20b. There is also a separation wall 22 located at the bottom of the first recessed portion 18. The separation wall 22 includes a mounting aperture 24, in which the fastener 16 is mounted in FIGS. 1, 2, 3A, 3B, and 11A. The mounting aperture 24 also includes a first recess portion 24a and a second recess portion 24b. Integrally formed as part of the separation wall 22 is a first ramp portion 22a and a second ramp portion 22b, the function of which will be described later. Also, integrally formed as part of the separation wall 22 is a first mounting projection 26a and a second mounting projection 26b. Each quarter portion 20a, 20b includes an arcuate wall 28, a side wall 30, and a stopper wall 32, where each stopper wall 32 is in proximity to one of the projections 26a, 26b.

Referring now to FIGS. 2B, 3A, and 7A-7C, the fastener 16 includes a base portion 34, and integrally formed with the base portion 34 is a large flange portion 36, which is substantially rectangular-shaped. Also integrally formed with the base portion 34 is a small flange portion 38, which is also substantially rectangular-shaped. The flange portions 36, 38 are oriented substantially 90° relative to one another. Integrally formed on a first end 36a of the large flange portion 36 is a first gate 40, and integrally formed on the second end 36b of the large flange portion 36 is a second gate 42. Also integrally formed as part of the large flange portion 36 is a slot 44, which is also substantially rectangular-shaped, and is oriented in parallel relative to the large flange portion 36. The large flange portion 36 has a first retention surface 46a and a second retention surface 46b, and the small flange portion 38 also includes a first retention surface 48a and a second retention surface 48b. The retention surfaces 48a, 48b formed as part of the small flange portion 38 are angled to provide a tight connection between the front cover 12a, PCB 14, and back cover 12b. The large flange portion 36 also includes a first mounting recess 50a formed as part of the first mounting surface 46a, and a second mounting recess 50b formed as part of the second mounting surface 46b.

Figure 1:
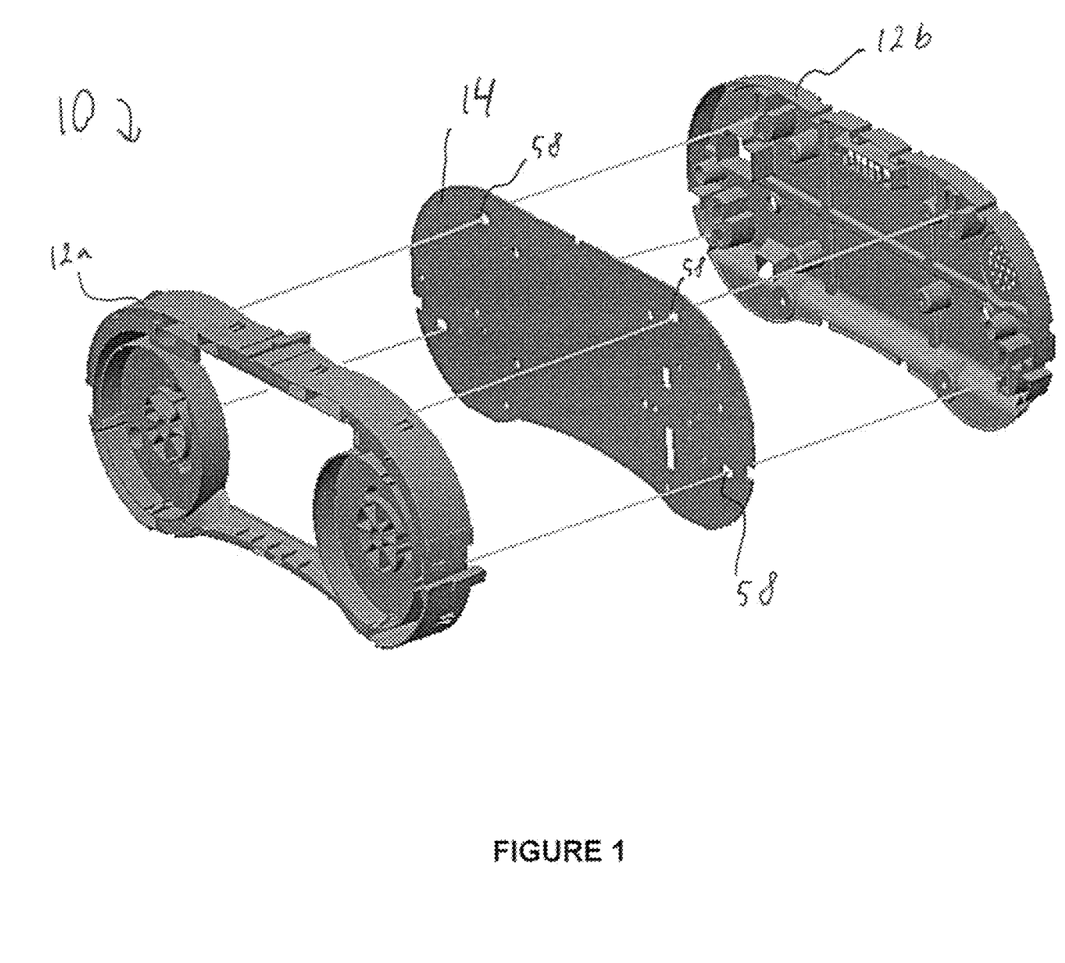
FIG. 1 is an exploded view of a front cover, a printed circuit board, and a back cover of an instrument cluster assembly, according to embodiments of the present invention.
Figure 2A:
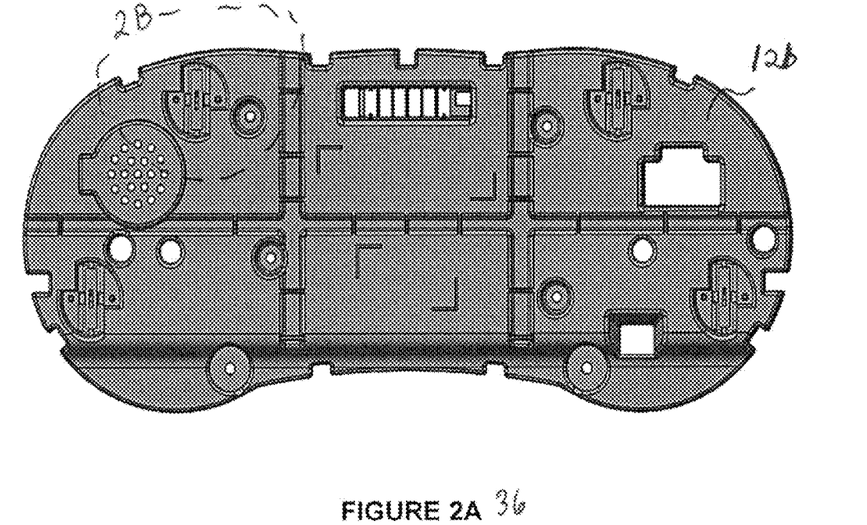
FIG. 2A is a rear view of a back cover used as part of an instrument cluster assembly, according to embodiments of the present invention.
Figure 2B:
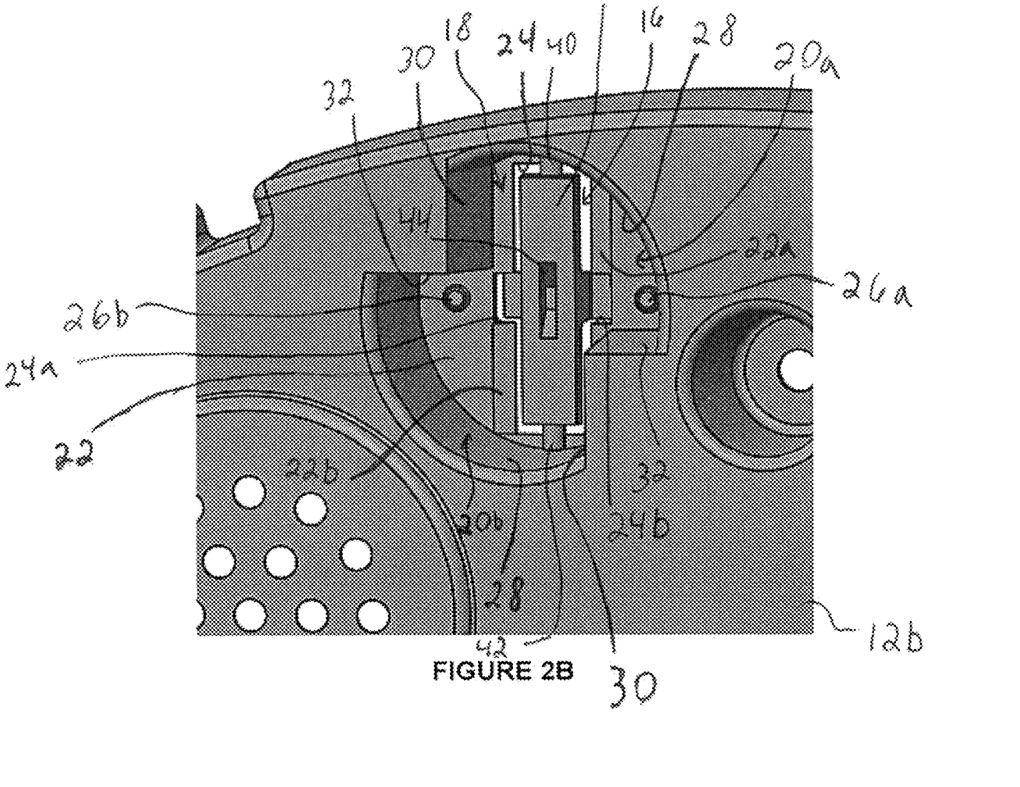
FIG. 2B is an enlarged perspective view of the circled portion of FIG. 2A.
Figure 3A:
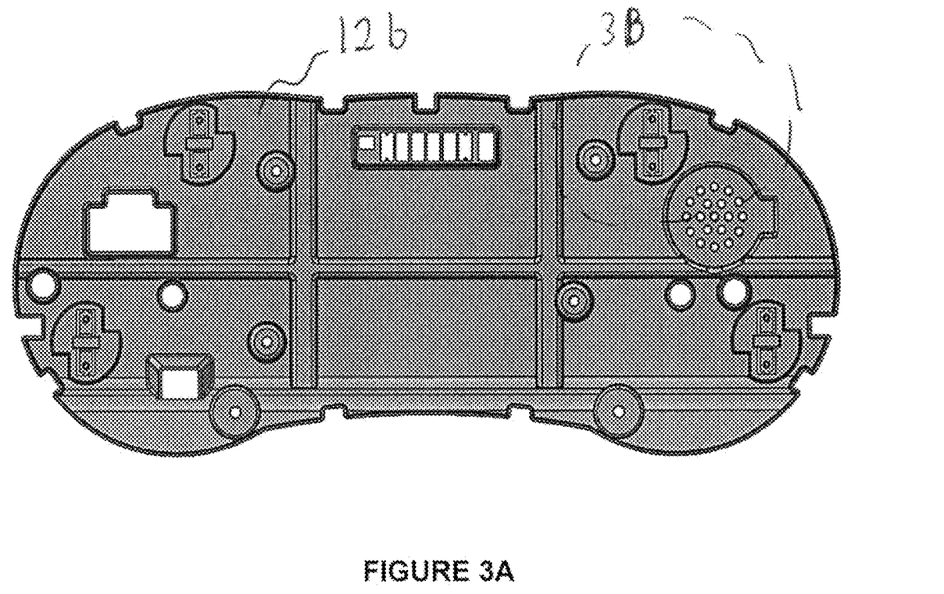
FIG. 3A is a front view of a back cover used as part of an instrument cluster assembly, according to embodiments of the present invention.
Figure 3B:
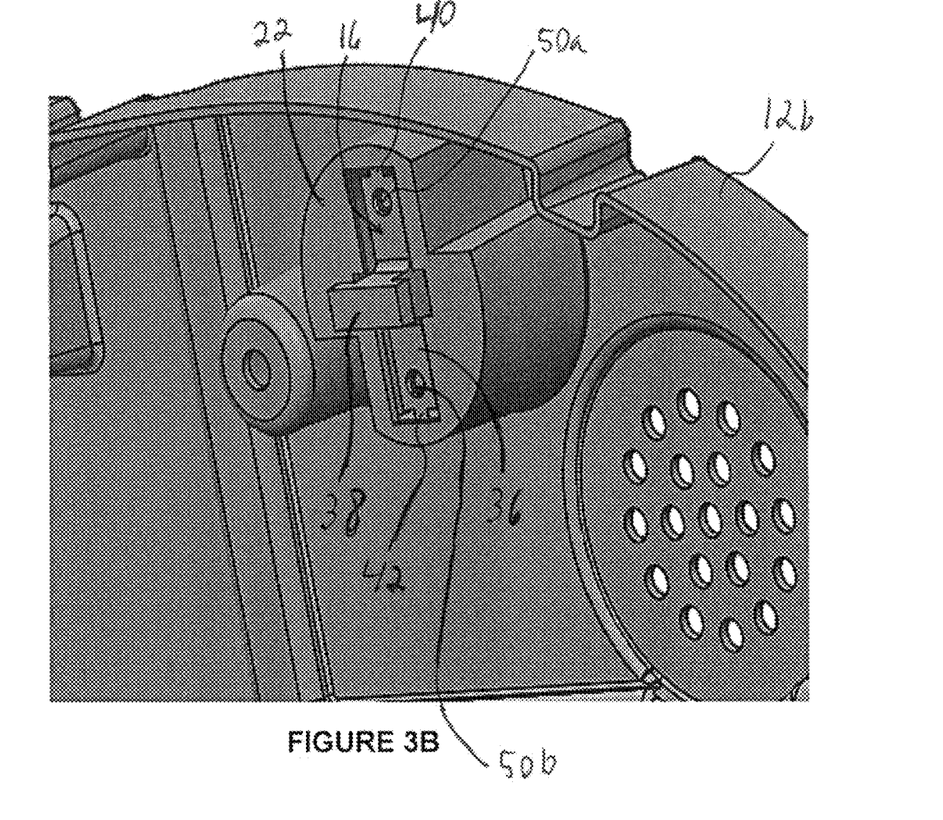
FIG. 3B is an enlarged perspective view of the circled portion of FIG. 3A.

The fastener 16 is integrally formed with the back cover 12b during the manufacturing process. More specifically, the gates 40, 42 are integrally formed with the back cover 12b such that the fastener 16 is located in the mounting aperture 24, and the integrated fastener 16 is oriented such that the large flange portion 36 is located in the first recessed portion 18, and the small flange portion 38 is located outside of the first recessed portion 18, as shown in FIG. 3B.

Figure 4A:
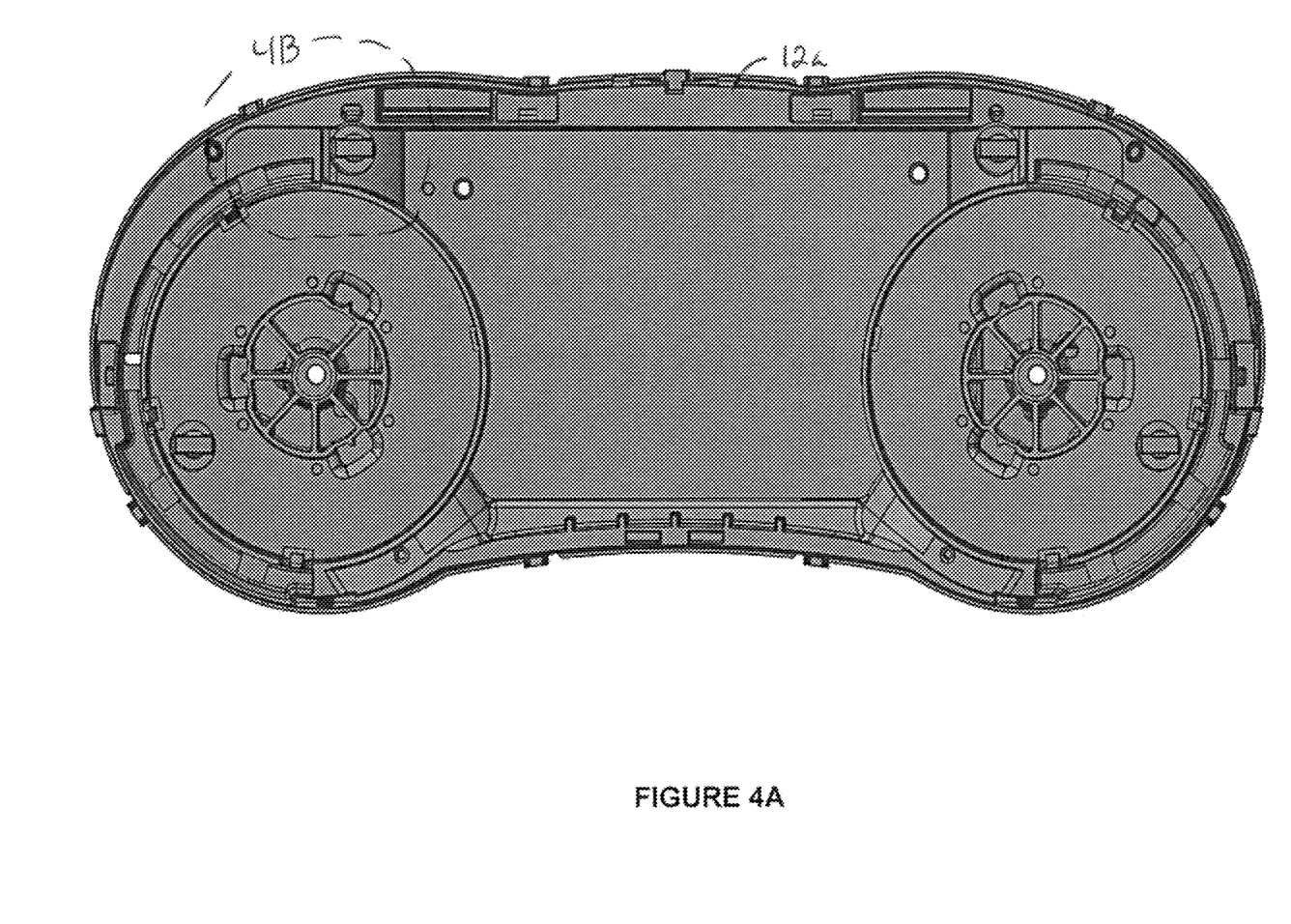
FIG. 4A is a front view of a front cover connected to a back cover used as part of an instrument cluster assembly, with the integrated fastener in a first configuration, according to embodiments of the present invention.
Figure 4B:
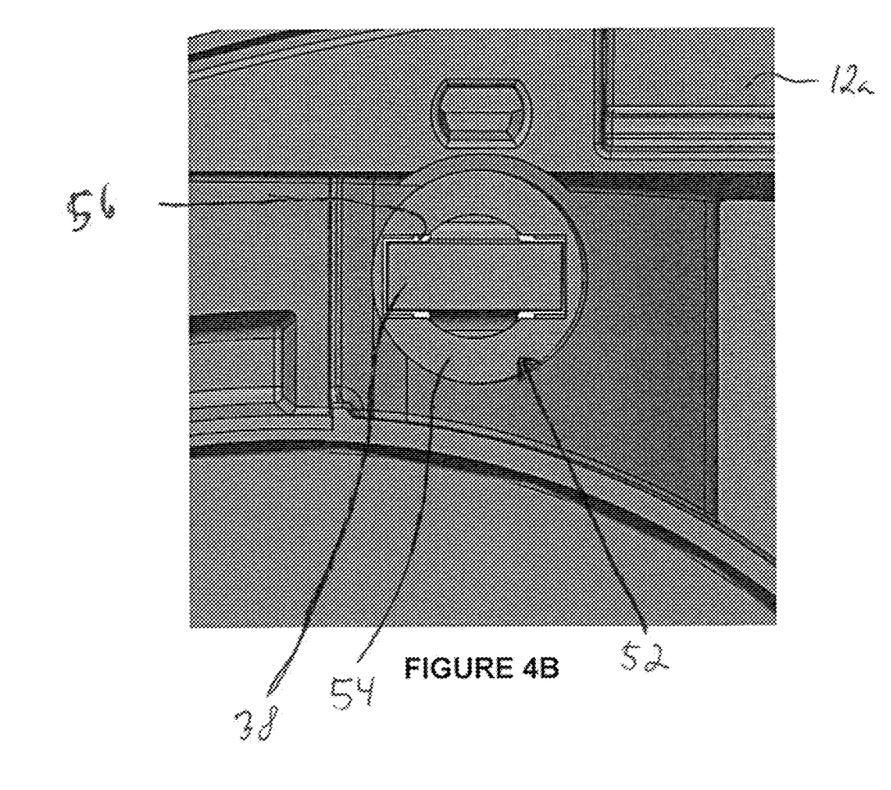
FIG. 4B is an enlarged perspective view of the circled portion of FIG. 4A.
Figure 5:
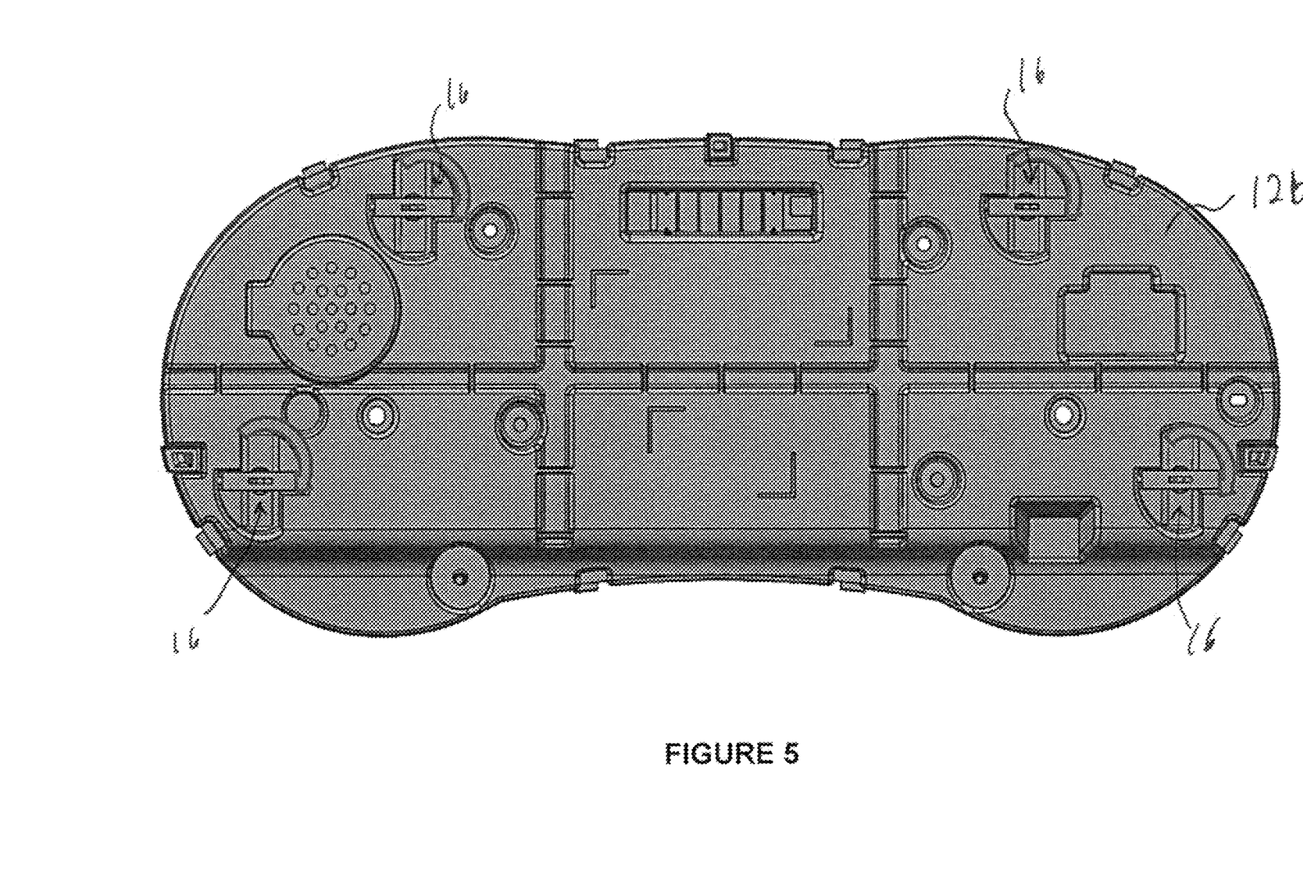
FIG. 5 is a rear view of a back cover used as part of an instrument cluster assembly, with the integrated fastener in a second configuration, according to embodiments of the present invention.
Figure 6A:
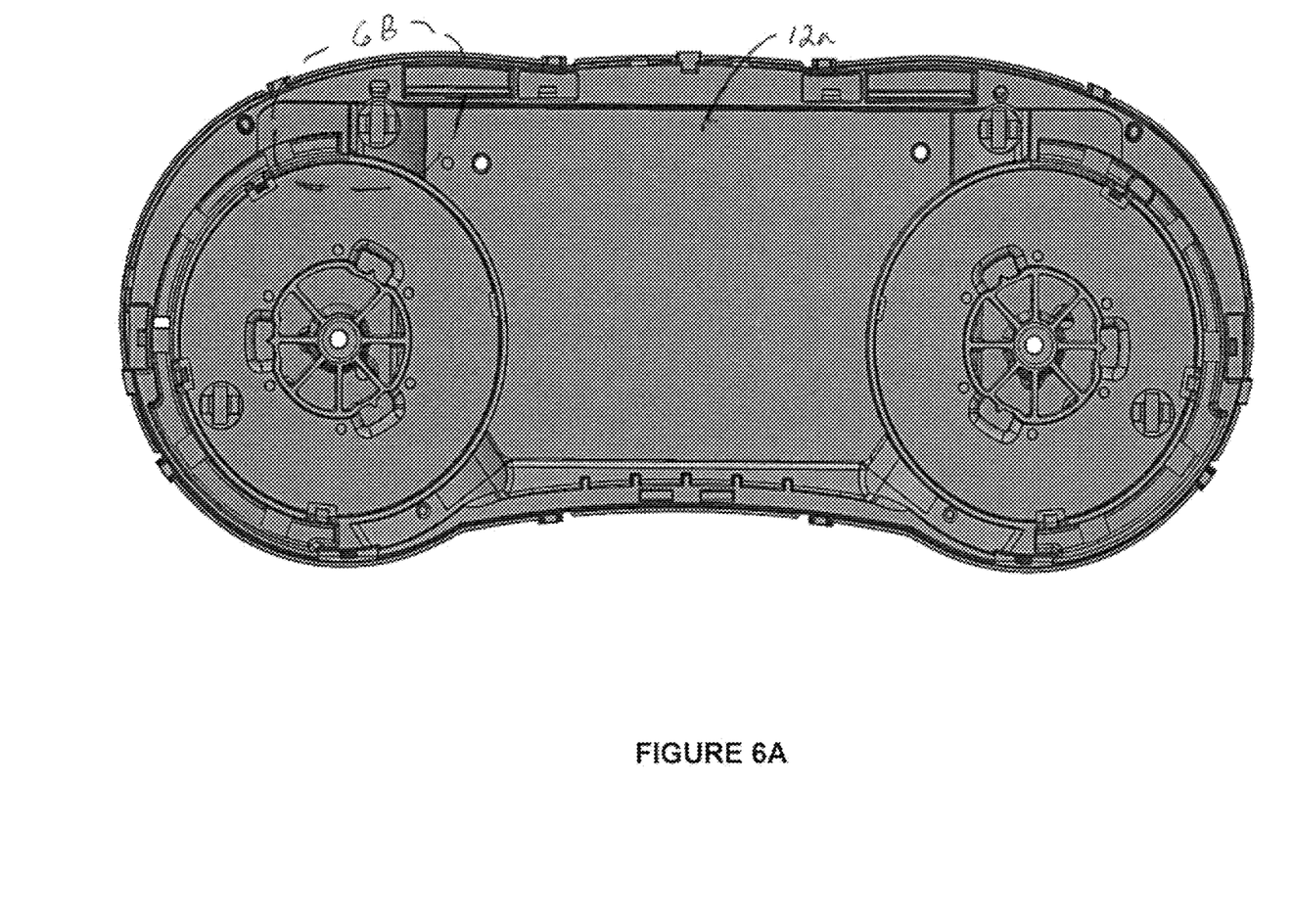
FIG. 6A is a front view of a front cover connected to a back cover used as part of an instrument cluster assembly, with the integrated fastener in the second configuration, according to embodiments of the present invention.
Figure 6B:
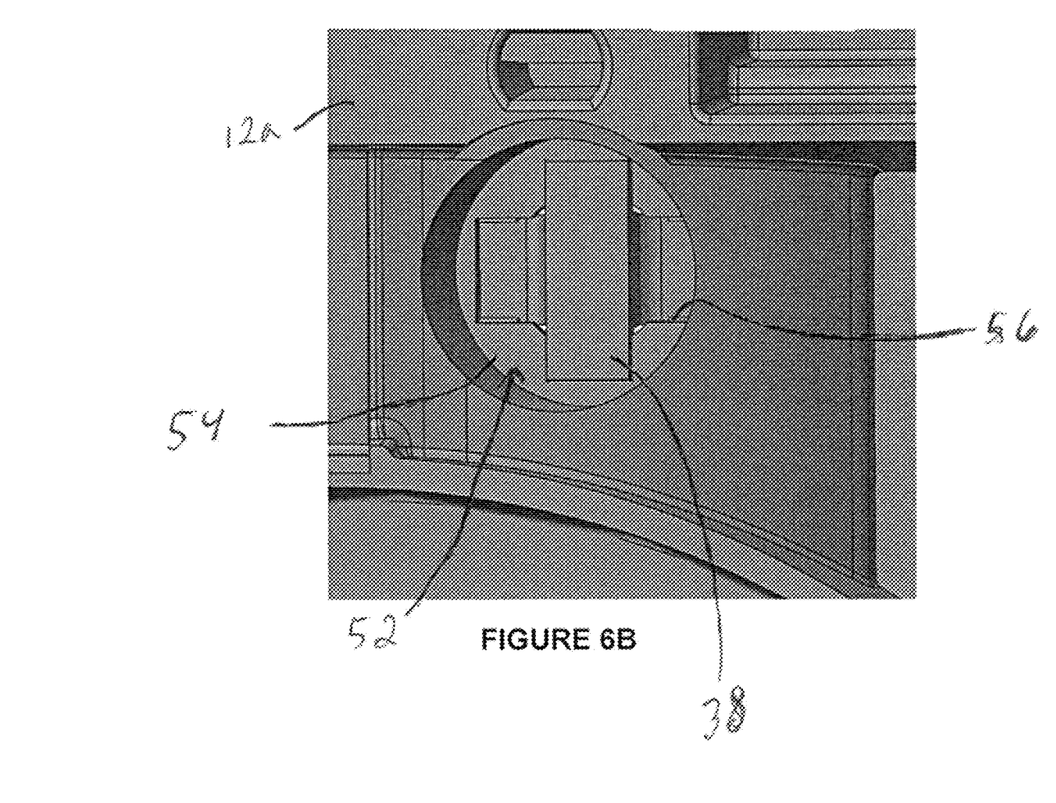
FIG. 6B is an enlarged perspective view of the circled portion of FIG. 6A.
Figure 7A:
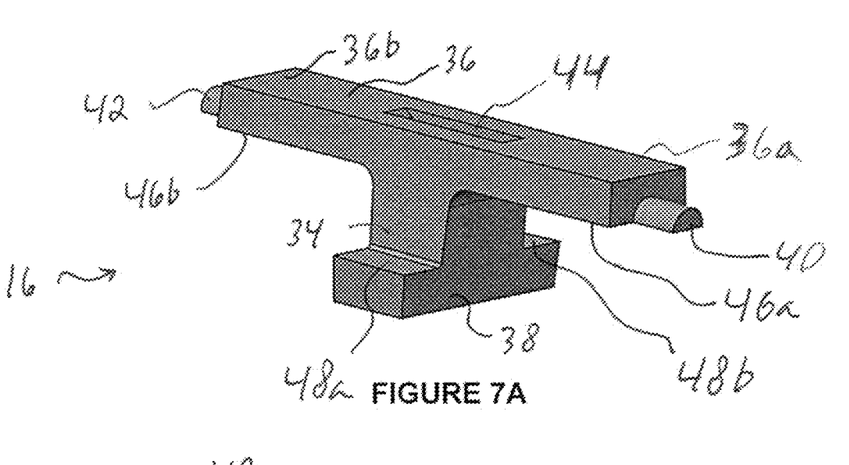
FIG. 7A is a perspective view of an integrated fastener used as part of an instrument cluster assembly, according to embodiments of the present invention.
Figure 7B:
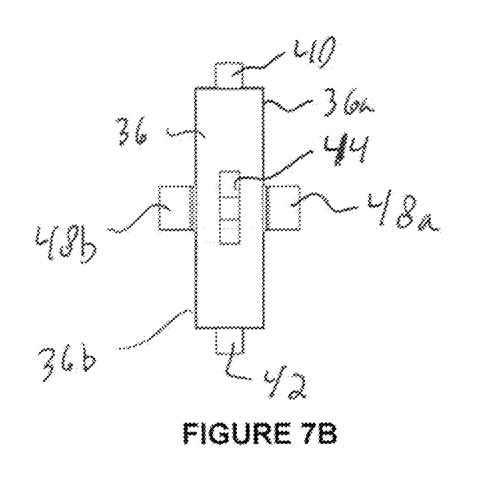
FIG. 7B is a top view of an integrated fastener used as part of an instrument cluster assembly, according to embodiments of the present invention.
Figure 7C:
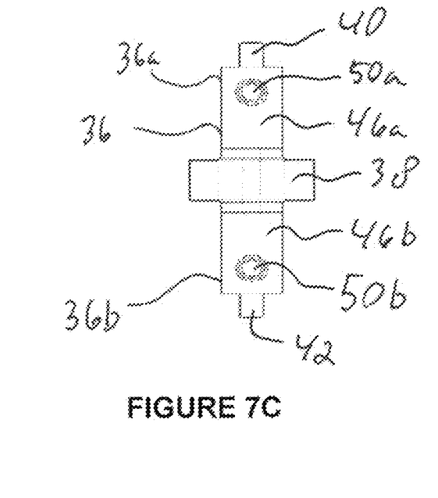
FIG. 7C is a bottom view of an integrated fastener used as part of an instrument cluster assembly, according to embodiments of the present invention.

Referring now to FIGS. 4A-4B, the front cover 12a also includes a second recessed portion, shown generally at 52, formed on the back of the front cover 12a. The recessed portion 52 has an inner wall 54, and the PCB 14 is disposed between the inner wall 54 and the separation wall 22 when the front cover 12a is placed in contact with the back cover 12b, as shown in FIGS. 4A-4B, 9A-9B, and 11A-11C. The inner wall 54 also has a second mounting aperture 56, which corresponds to the shape of the small flange portion 38, but is larger in size such that the small flange portion 38 is able to pass through the second mounting aperture 56.

The PCB 14 also includes several through-apertures 58, which the small flange portions 38 of the fastener 16 pass through during assembly. Each through-aperture 58 may also be of a shape corresponding to the shape of the small flange portion 38, or may be of a different shape, so long as the small flange portion 38 is able to pass through the through-aperture 58.

Figure 8:
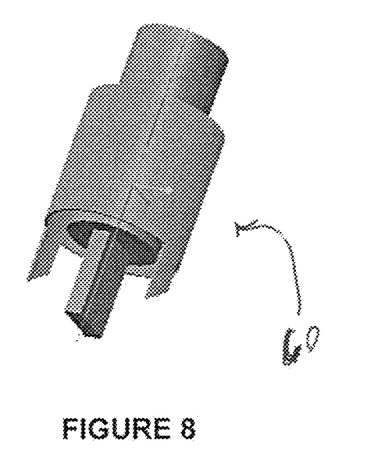
FIG. 8 is a is a perspective view of a tool used to assemble an instrument cluster assembly, according to embodiments of the present invention.

The assembly 10 is connected together with each fastener 16 using a tool, shown generally in FIGS. 8-110 at 60. The tool 60 includes main body 62, and a cavity, shown generally at 64, formed as part of the main body 62. The main body 62 also includes two semi-circular flange portions 66a, 66b, and the semi-circular flange portions 66a, 66b extend through corresponding slots 68a, 68b formed as part of a sleeve 70. The sleeve 70 has an outer shell 72 which surrounds the main body 62, and an end plate 74. A spring 84 is disposed in the cavity 64 and is in contact with the end plate 74 and a front surface 76 inside the cavity 64 of the main body 62. The sleeve 70 also includes two cutting flanges 78a, 78b which extend away from the sleeve 70, which have sharp edges 80a, 80b used for cutting the gates 40, 42 during assembly.

The main body 62 also includes a key way 82, part of which has a flange 82a that corresponds to the shape of the slot 44. The sleeve 70 is movable relative to the main body 62. The spring 84 located between the end plate 74 and the front surface 76 biases the sleeve 70 relative to the main body 62 such that the tool 60 is biased towards a retracted position, where the end plate 74 is biased away from the front surface 76, and the cutting flanges 78a, 78b are biased away from the fastener 16.

Figure 9A:
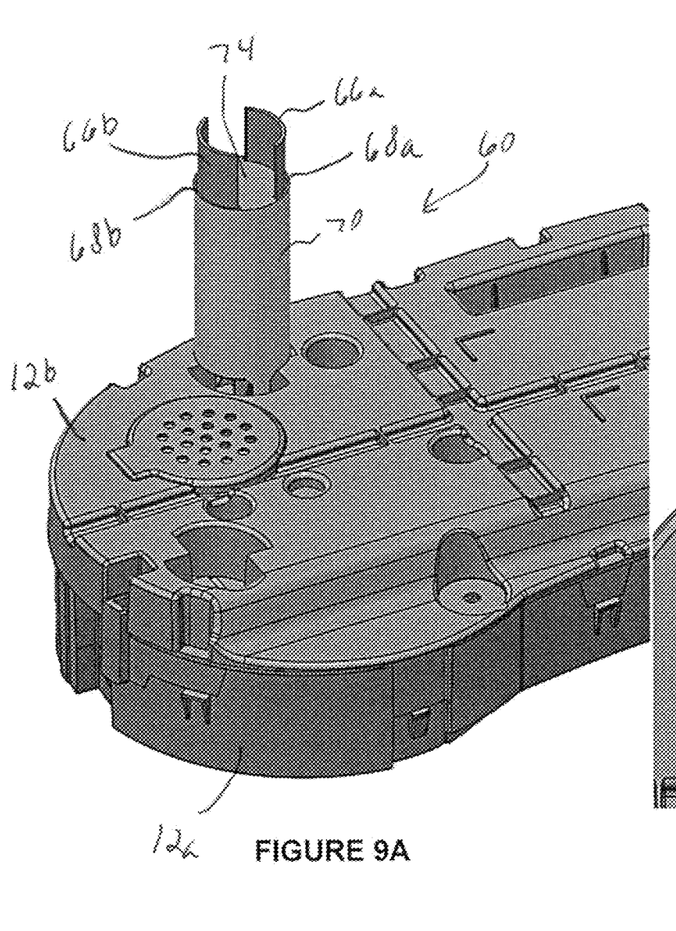
FIG. 9A is a perspective view of a portion of an instrument cluster assembly being assembled by a tool, according to embodiments of the present invention.
Figure 9B:
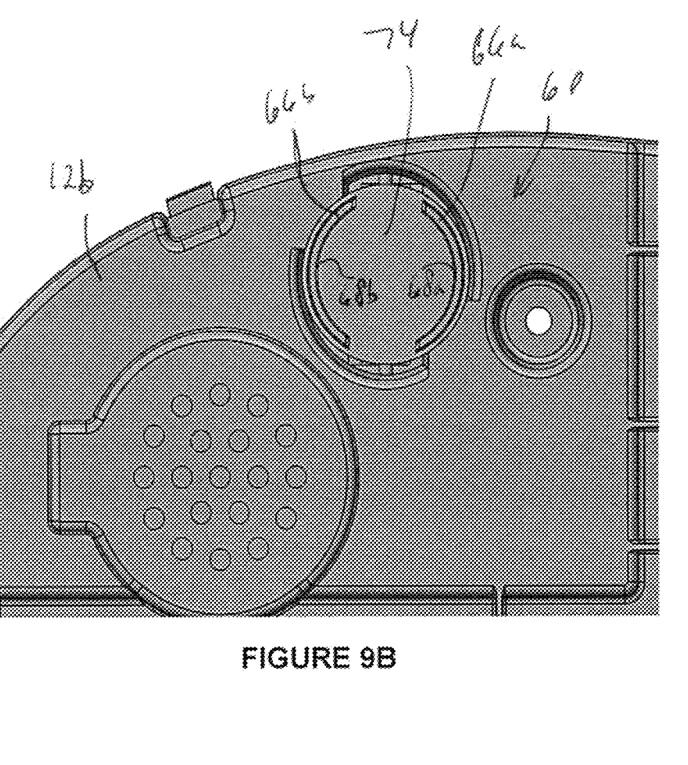
FIG. 9B is a rear view of a portion of an instrument cluster assembly being assembled by a tool, according to embodiments of the present invention.
Figure 10:
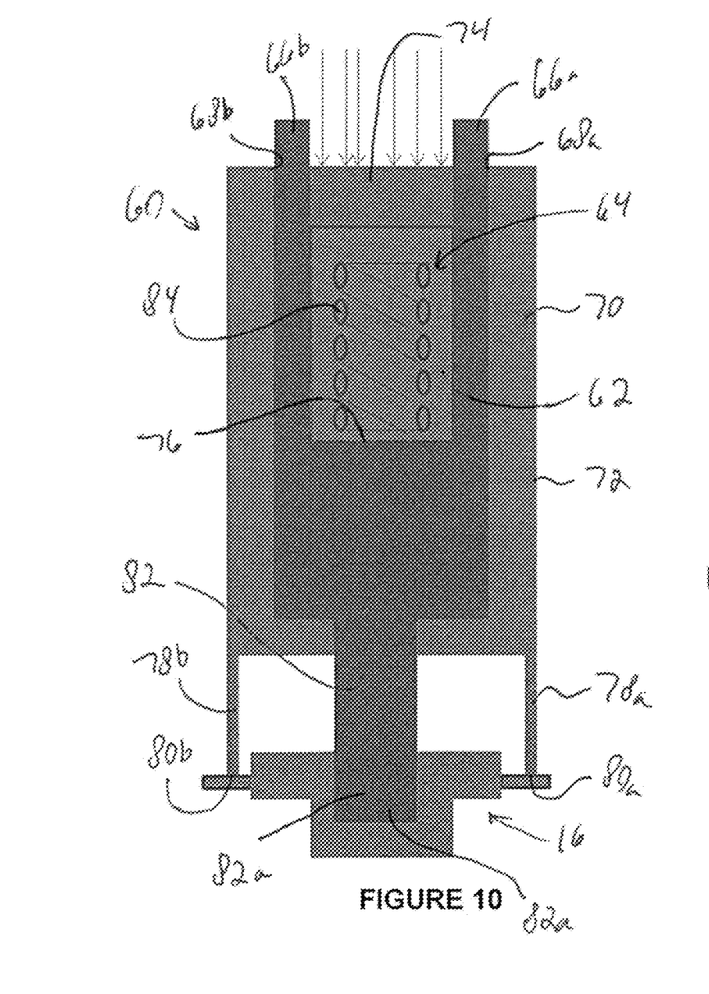
FIG. 10 is a sectional side view of a tool used to assemble an instrument cluster assembly, according to embodiments of the present invention.
Figure 11A:
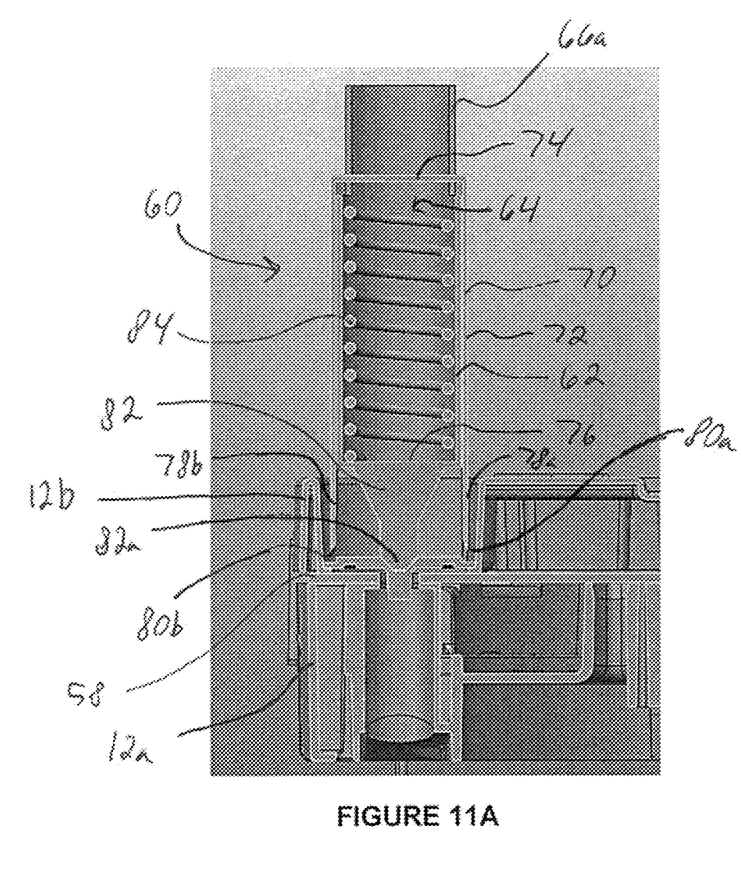
FIG. 11A is a sectional side view of a portion of an instrument cluster assembly being assembled by a tool, where the integrated fastener is in a first configuration, according to embodiments of the present invention.
Figure 11B:
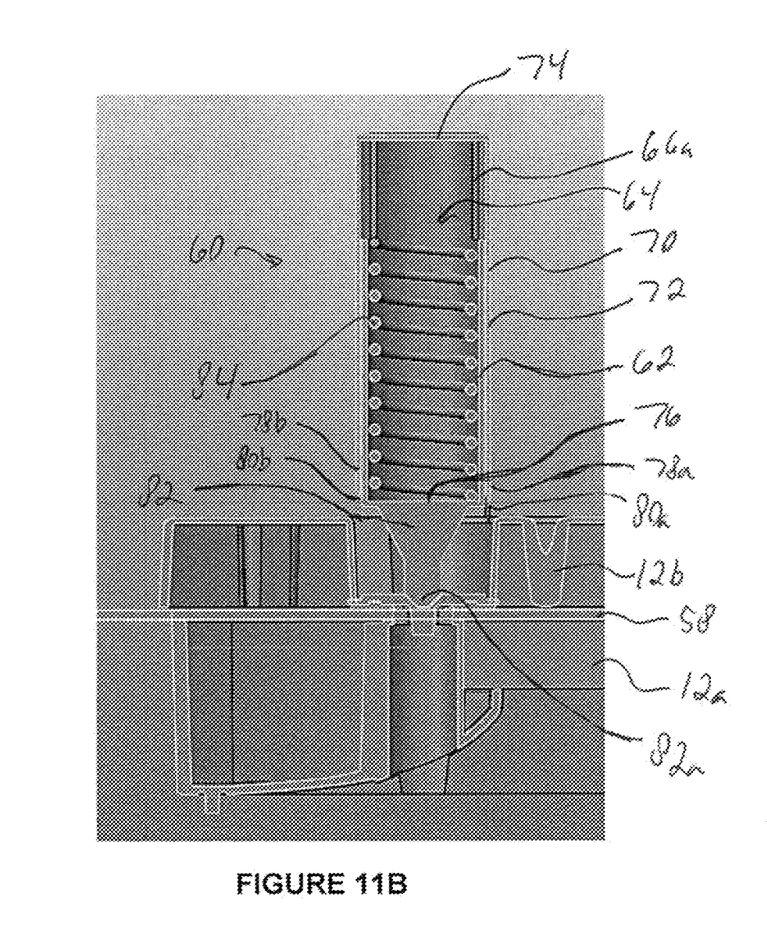
FIG. 11B is a sectional view of a portion of an instrument cluster assembly being assembled by a tool, with the integrated fastener in a second configuration, according to embodiments of the present invention.
Figure 11C:
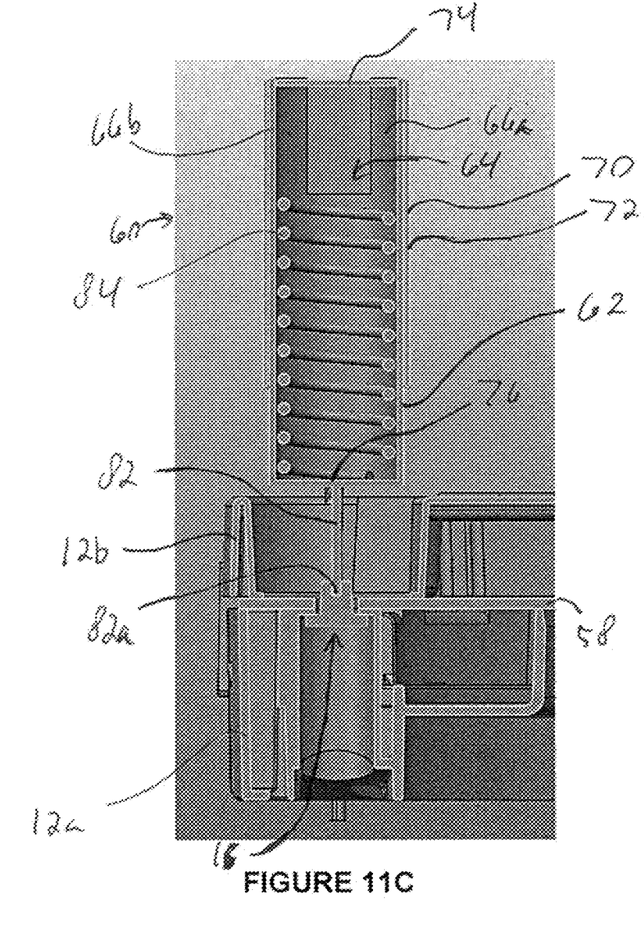
FIG. 11C is a second sectional view of a portion of an instrument cluster assembly being assembled by a tool, with the integrated fastener in a second configuration, according to embodiments of the present invention.

Prior to assembly, the integrated faster 16 is in a first, or pre-connection configuration, shown in FIGS. 2A-4B, 9A, and 11A. During assembly, the PCB 14 is disposed between the front cover 12a and the back cover 12b, and the front cover 12a and the back cover 12b are positioned such that the small flange portion 38 passes through the through-apertures 58 and the second mounting aperture 56, and the inner wall 54 and separation wall 22 are both in contact with the PCB 14. Once in the first configuration, the tool 60 is positioned relative to the assembly 10 such that the key way 82 is inserted into the slot 44, as shown in FIGS. 9A and 11A. Both of the cutting flanges 78a, 78b are heated, and after the flange 82a of the key way 82 is located in the slot 44, the sleeve 70 is moved against force of the spring 84 relative to the main body 62 such that the first edge 80a is placed in contact with the first gate 40, and the second edge 80b is placed in contact with the second gate 42. Force is applied to the sleeve 70 such that the gates 40, 42 are cut by the edges 80a, 80b of the cutting flanges 78a, 78b, detaching the fastener 16 from the back cover 12b.

Once the fastener 16 is detached, the entire tool 60 is rotated such that the fastener 16 is rotated as well. The fastener 16 is rotated substantially 90°, such that the retention surfaces 46a, 46b of the large flange portion 36 engage with the corresponding ramp portions 22a, 22b and then slide along the separation wall 22. More specifically, the first retention surface 46a engages the first ramp portion 22a, and the second retention surface 46b engages the second ramp portion 22b. The ramp portions 22a, 22b facilitate the engagement between the fastener 16 and the back cover 12b. Also during rotation, the retention surfaces 48a, 48b of the small flange portion 38 slide along the inner wall 54 and the retention surfaces 46a, 46b of the large flange portion 36 slide along the separation wall 22 until the first end 36a of large flange portion 36 comes in contact with the stopper wall 32 formed as part of the first quarter portion 20a, and the second end 36b comes in contact with the stopper wall 32 formed as part of the second quarter portion 20b. As this occurs, and as the ends 36a, 36b contact the corresponding stopper walls 32, the large flange portion 36 deflects to allow the first mounting projection 26a to be inserted into the first mounting recess 50a, and the second mounting projection 26b to be inserted into the second mounting recess 50b.

Once the first mounting projection 26a is in the first mounting recess 50a and the second mounting projection 26b is in the second mounting recess 50b, the fastener 16 is in a second, or connected configuration, as shown in FIGS. 5, 6A-6B, and 11B-11C. Once on the second configuration, the separation wall 22, PCB 14, and the inner wall 54 are disposed between the retention surfaces 46a, 46b, 48a, 48b, such that the front cover 12a, PCB 14, and the back cover 12b are connected together.

As mentioned above, the retention surfaces 48a, 48b of the small flange portion 38 are angled, which increases the force applied to the front cover 12a, back cover 12b, and PCB 14 by the fastener 16 as the fastener 16 is rotated. The angle of each retention surface 48a, 48b may be changed, depending upon the application, to increase or decrease the amount of force applied by the fastener 16 to the front cover 12a, PCB 14, and back cover 12 once the fastener 16 is in the second configuration.

Once the front cover 12a and the back cover 12b are connected together, the tool 60 is then moved away from the assembly 10 such that the flange 82a of the key way 82 is no longer located in the slot 44.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising: an instrument cluster assembly, including:
   a front cover; a back cover;
   at least one integrated fastener integrated into the back cover; and a first mounting aperture formed as part of the back cover, the at least one integrated fastener attached to the back cover and located in the mounting aperture when the at least one integrated fastener is in a first configuration;
   wherein the at least one integrated fastener is detached from the back cover, and rotated to place the at least one integrated fastener in a second configuration, securing the front cover to the back cover;
   a base portion;
   a large flange portion integrally formed with the base portion; and
   a small flange portion integrally formed with the base portion;
   wherein both the large flange portion and the small flange portion rotate as the at least one integrated fastener is changed from the first configuration to the second configuration;
   at least one gate formed as part of the large flange portion;
   wherein the at least one gate is cut to detach the at least one integrated fastener from the back cover.

2. The apparatus of claim 1, further comprising:
   a first recessed portion formed as part of the back cover; and
   a separation wall formed as part of the back cover in proximity to the first recessed portion;
   wherein the first mounting aperture is formed as part of the separation wall.

3. The apparatus of claim 2, further comprising:
   a second recessed portion formed as part of the front cover;
   an inner wall formed as part of the second recessed portion; and
   a second mounting aperture formed as part of the inner wall;
   wherein at least a portion of the at least one integrated fastener extends through the second mounting aperture when the at least one integrated fastener is in the second configuration.

4. The apparatus of claim 1, further comprising:
at least one mounting projection formed as part of a separation wall; and
at least one mounting recess formed as part of the at least one integrated fastener;
wherein the at least one mounting projection is disposed in the at least one mounting recess when the at least one integrated fastener is placed in the second configuration.

5. The apparatus of claim 1, the at least one integrated fastener further comprising:
at least one retention surface formed as part of the large flange portion; and
at least one retention surface formed as part of the small flange portion;
wherein a separation wall and an inner wall are disposed between the at least one retention surface formed as part of the large flange portion and the at least one retention surface formed as part of the small flange portion when the at least one integrated fastener is in the second configuration.

6. The apparatus of claim 5, wherein the at least one retention surface formed as part of the small flange portion is at least one angled retention surface, increasing the force applied to the separation wall and the inner wall by the at least one integrated faster, as the at least one integrated fastener is rotated.

7. The apparatus of claim 1, the at least one integrated fastener further comprising:
a slot formed as part of the large flange portion;
wherein a tool is at least partially inserted into the slot to change the at least one integrated fastener from the first configuration to the second configuration.

8. The apparatus of claim 1, further comprising:
at least one stopper wall formed as part of a first recessed portion;
wherein the at least one integrated fastener is in contact with the at least one stopper wall when the at least one integrated fastener is in the second configuration.

9. An instrument cluster assembly having an integrated fastener, comprising:
a front cover;
a back cover;
at least one integrated fastener integrated into the back cover;
a first recessed portion formed as part of the back cover;
a separation wall formed as part of the back cover in proximity to the first recessed portion;
a first mounting aperture formed as part of the separation wall, the at least one integrated fastener attached to the back cover and located in the mounting aperture when the at least one integrated fastener is in a first configuration;
at least one mounting projection formed as part of the separation wall;
at least one mounting recess formed as part of the at least one integrated fastener;
a second recessed portion formed as part of the front cover;
an inner wall formed as part of the recessed portion; and
a second mounting aperture formed as part of the inner wall;
wherein the at least one integrated fastener is detached from the back cover and rotated such that the at least one integrated fastener is placed in a second configuration, and the at least one mounting projection is disposed in the at least one mounting recess, securing the front cover to the back cover.

10. The instrument cluster assembly having an integrated fastener of claim 9, the at least one integrated fastener further comprising:
a base portion;
a large flange portion integrally formed with the base portion;
a small flange portion integrally formed with the base portion;
at least one gate formed as part of the large flange portion; and
a slot formed as part of the large flange portion;
wherein the at least one gate is integrally formed with the front cover such that the at least one integrated fastener is located in the mounting aperture.

11. The instrument cluster assembly having an integrated fastener of claim 10, the at least one integrated fastener further comprising:
at least one retention surface formed as part of the large flange portion; and
at least one retention surface formed as part of the small flange portion;
wherein the separation wall and the inner wall are disposed between the at least one retention surface formed as part of the large flange portion and the at least one retention surface formed as part of the small flange portion when the at least one integrated fastener is in the second configuration.

12. The instrument cluster assembly having an integrated fastener of claim 10, wherein the at least one gate is cut to detach the at least one integrated fastener from the back cover.

13. The instrument cluster assembly having an integrated fastener of claim 10, wherein the at least one retention surface formed as part of the small flange portion is at least one angled retention surface, increasing the force applied to the separation wall and the inner wall by the at least one integrated fastener as the at least one integrated fastener is rotated.

14. The instrument cluster assembly having an integrated fastener of claim 9, wherein at least a portion of the at least one integrated fastener extends through the second mounting aperture when the at least one integrated fastener is in the second configuration.

15. The instrument cluster assembly having an integrated fastener of claim 9, further comprising:
at least one stopper wall formed as part of the first recessed portion;
wherein the at least one integrated fastener is in contact with the at least one stopper wall when the at least one integrated fastener is in the second configuration.

16. A tool for assembling an instrument cluster assembly, comprising:
a main body;
a cavity formed as part of the main body;
a sleeve at least partially surrounding the main body;
an end plate formed as part of the sleeve;
a front surface formed as part of the main body;
a spring disposed in the cavity between the end plate and the front surface;
a keyway formed as part of the main body;
at least one cutting flange formed as part of the sleeve;
wherein the main body is positioned such that the keyway is engaged with an integrated fastener, and the sleeve is moved relative to the main body against the force of the spring such that the at least one cutting flange applies force to the integrated fastener, detaching the integrated fastener from a back cover of the instrument cluster assembly.

17. The tool for assembling an instrument cluster assembly of claim 16, wherein after the integrated fastener is detached from the instrument cluster assembly, the tool is rotated such that the keyway rotates the integrated fastener, securing the back cover to a front cover.

18. The tool for assembling an instrument cluster assembly of claim 16, further comprising:
   at least one semi-circular flange formed as part of the main body; and
   at least one slot formed as part of the sleeve;
   wherein the at least one semi-circular flange moves through the at least one slot to guide the movement of the sleeve relative to the main body.

* * * * *